United States Patent [19]
Kimura et al.

[11] Patent Number: 5,633,789
[45] Date of Patent: May 27, 1997

[54] FAILURE-FREE POWER SOURCE DEVICE

[75] Inventors: Takumi Kimura; Katsunori Akaba; Fumihiko Hiratsuka; Takaaki Sato, all of Tokyo, Japan

[73] Assignee: NEC Corporation, Tokyo, Japan

[21] Appl. No.: 344,673

[22] Filed: Nov. 21, 1994

[30] Foreign Application Priority Data

Nov. 24, 1993 [JP] Japan .................................. 5-292310

[51] Int. Cl.⁶ ...................................................... H02H 7/10
[52] U.S. Cl. .................... 363/50; 307/86; 363/37
[58] Field of Search ........................... 363/37, 50, 51, 363/52, 55; 307/46, 66, 85, 86

[56] References Cited

U.S. PATENT DOCUMENTS 5,070,251  12/1991  Rhodes et al. ............................. 307/46
5,272,382  12/1993  Heald et al. ............................... 307/66
5,338,994  8/1994   Lezan et al. ............................... 307/86

FOREIGN PATENT DOCUMENTS 61247277  11/1986  Japan .

OTHER PUBLICATIONS

"Joint Electricity Study"; the Expert Committee for Measures against Momentary Voltage Drops, Japanese Society for Joint Electricity Study, Vo. 46, No. 3, pp. 7–8, Figure 1–2–1 (issued Feb. 07, 1990) [in Japanese].

*Primary Examiner*—Peter S. Wong
*Assistant Examiner*—Y. J. Han
*Attorney, Agent, or Firm*—Whitham, Curtis, Whitham & McGinn

[57] ABSTRACT

A failure-free power source device memorizes the history of errors of a commercially available power source, monitors the stability of the power source on the basis of the history, directly outputs, when the power source remains stable for more than a predetermined period of time, an AC input as an AC output, and releases, when an error occurs in the power source, energy stored in an accumulator until a predetermined period of time expires to thereby output it as an AC output via an inverter.

19 Claims, 6 Drawing Sheets

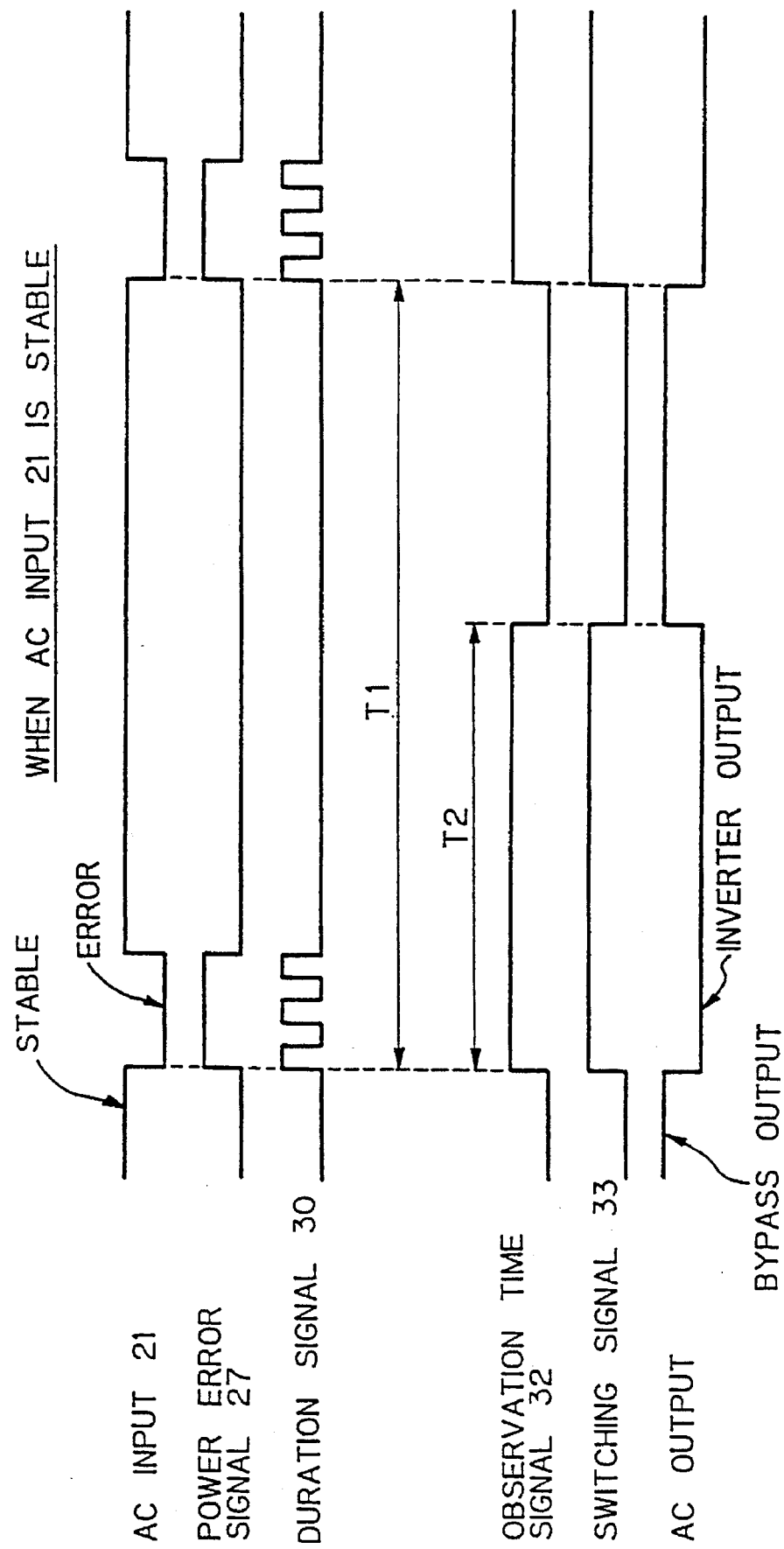

FAILURE-FREE POWER SOURCE DEVICE

BACKGROUND OF THE INVENTION

The present invention relates to a failure-free power source device for automatically selecting an AC output matching the degree of stability of an AC power source. More particularly, the present invention is concerned with a failure-free power source device which directly outputs, when an AC power source is stable, an AC input as an AC output or outputs, when an error occurs in the power source, energy stored in an accumulator as the AC output via an inverter.

A failure-free power source device supplies AC power stably to a major load which has to operate continuously even in the event of unexpected power failures. Conventional power source devices of this kind are generally classified into two types, i.e., a constant inverter type device and a constant commercial source type device. The constant inverter type device constantly supplies an AC input from an AC power source to a load as an AC output via a rectifier, accumulator and inverter. The constant commercial source type device has a switching device which supplies, when the AC input is stable, the AC input to the load as the AC output or supplies, on detecting an error in the AC input, the AC input to the load via a rectifier, accumulator and inverter. The constant commercial source type device is disclosed in, for example, Japanese Patent Laid-Open Publication No. 61-247277.

A report entitled "Joint Electricity Study", the Expert Committee for Measures against Momentary Voltage Drops belonging to the Japanese Society for Joint Electricity Study, Vol. 46, No. 3, page 8, FIG. 1-2-1 (issued Feb. 7, 1990) shows the estimated results of yearly mean momentary voltage drop for a single 6.6 kV high-tension distribution line in Japan. This document reports that a momentary voltage drop occurs once a month on the average. Therefore, for loads of the kind not needing stable AC power, the constant commercial source type device will suffice. However, voltage drops in an end power source system are attributable not only to voltage drops on the 6.6 kV distribution line but also to the other loads on a low-tension distribution line and belonging to the same system, as well as wiring distance, problems and troubles derived from power source errors, etc. The constant commercial source type device should, therefore, sometimes be replaced with the constant inverter type device. It follows that to install a conventional failure-free power source device, it is necessary to examine the degree of stability of a commercial power source available at a desired location beforehand and then determine the type of the device matching the location.

Table 1 shown below compares the characteristics of the two types of failure-free power source devices (output capacity of 1.5 kV).

TABLE I

| | Type | |
| --- | --- | --- |
| Item | Constant Inverter | Constant Commercial Source |
| Fluctuation of Input | ±12% | ±10% |
| Power Consumption (Including Conversion Loss) | 500W | 100W |
| Heat | 430kcal/h | 86kcal/h |
| Noise (Characteristic A) | 40dB | null |

TABLE I-continued

| | Type | |
| --- | --- | --- |
| Item | Constant Inverter | Constant Commercial Source |
| Output Voltage & Frequency Accuracy | | |
| Normal AC Input | volt: ±3% freq: ±0.5% | dependent on AC input fluctuation |
| AC Input Failure | volt: ±3% freq: ±0.3% | volt ±3% freq: ±0.5% |

As Table 1 indicates, the input voltage fluctuates over a narrower range with the constant commercial source type device than with the constant inverter type device. The constant commercial source type device consumes less power than the constant inverter type device. As for the generation of heat and noise, the constant commercial source type device is advantageous over the constant inverter type device. Further, regarding the accuracy of output voltage and that of output frequency, the constant inverter type device and the constant commercial source type device are comparable in the event of a power failure. However, when the AC input is normal, the constant commercial source type device depends on the stability of the AC input while the constant inverter type device remains the same as at the time of a power failure.

The conventional failure-free power source devices have the following problems left unsolved in addition to the previously mentioned advance examination problem. When the constant commercial source type device is introduced in a power supply system wherein the commercial power source is unstable, the AC output of the device itself becomes unstable. This renders a load faulty, reduces the life of an accumulator due to the frequent discharge of the accumulator, and interrupts the AC output in the event of a power failure due to the short charging of the accumulator. On the other hand, when the constant inverter type device is applied to a power source system wherein the commercial power source is stable, it brings about wasteful power consumption due to conversion losses within the device and the generation of heat and noise.

SUMMARY OF THE INVENTION

It is, therefore, an object of the present invention to provide a failure-free power source device which prevents the life of an accumulator from being reduced and prevents, at the time of a power failure, the supply of an AC output from being interrupted due to the short charging of the accumulator.

It is another object of the present invention to provide a failure-free power source device which eliminates wasteful power consumption due to conversion losses particular thereto and generation of heat and noise.

A failure-free power source device of the present invention has a rectifier for converting input AC power to first DC power, an accumulator for accumulating the first DC power to prepare for a discharge at the time of a power failure while outputting second DC power, an inverter for converting the second DC power to AC power to thereby output an inverter signal, a bypass circuit for directly receiving the input AC power and outputting it as a bypass signal, and a power error detector for receiving the input AC power and outputting, on detecting an error in the input AC power, a power error signal. Further the failure-free power source device of the present invention includes an end-of-observation monitor for outputting a switching signal by determining, in response to the power error signal, whether or not the input AC power has remained stable for a predetermined period of time, and a selector for outputting, on receiving at least one of the power error signal and switching signal, the inverter output as an AC output or outputting, when neither the power error signal nor the switching signal appears, the bypass signal as the AC output.

BRIEF DESCRIPTION OF THE DRAWINGS

The above and other objects, features and advantages of the present invention will become more apparent from the following detailed description taken with the accompanying drawings in which:

FIGS. 5A and 5B are timing charts indicating the specific waveforms of signals appearing in the embodiment when an AC input is stable and when it is unstable, respectively.

DESCRIPTION OF THE PREFERRED EMBODIMENT

Figure 1:
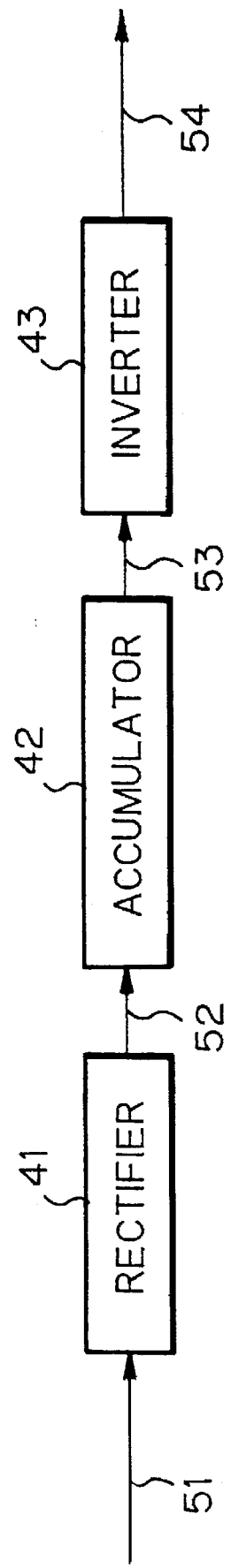
FIG. 1 is a block diagram schematically showing a conventional constant inverter type failure-free power source device.

To better understand the present invention, a brief reference will be made to a conventional constant inverter type failure-free power source device, shown in FIG. 1. As shown, the power source device has a rectifier 41 for transforming an AC input 51 from a commercially available power source or similar AC power source to DC power 52. A accumulator 42 stores the DC power 52 and constantly remains in a stand-by state, preparing for a discharge at the time of a power failure. An inverter 43 converts DC power 53 output from the accumulator 42 to a stable AC output 54. In operation, as long as the rectifier 41 feeds the DC power 52 to the accumulator 42, the accumulator 42 stores it while feeding the DC power 53 to the inverter 43 (stand-by state). The inverter 43 converts the input DC power 53 to the stable AC output 54. In the event of a power failure, the AC input 51 and, therefore, the DC power 52 from the rectifier 41 to the accumulator 42 is interrupted. Then, the accumulator 42 outputs the DC power 53 by releasing energy accumulated therein. The inverter 43 transforms such DC power 53 to the stable AC output 54.

The above-described type of power source device supplies the AC output 54 via the inverter 43 at all times and is, therefore, desirable when the commercial power source is not stable and for loads of the kind needing stable AC power.

Figure 2:
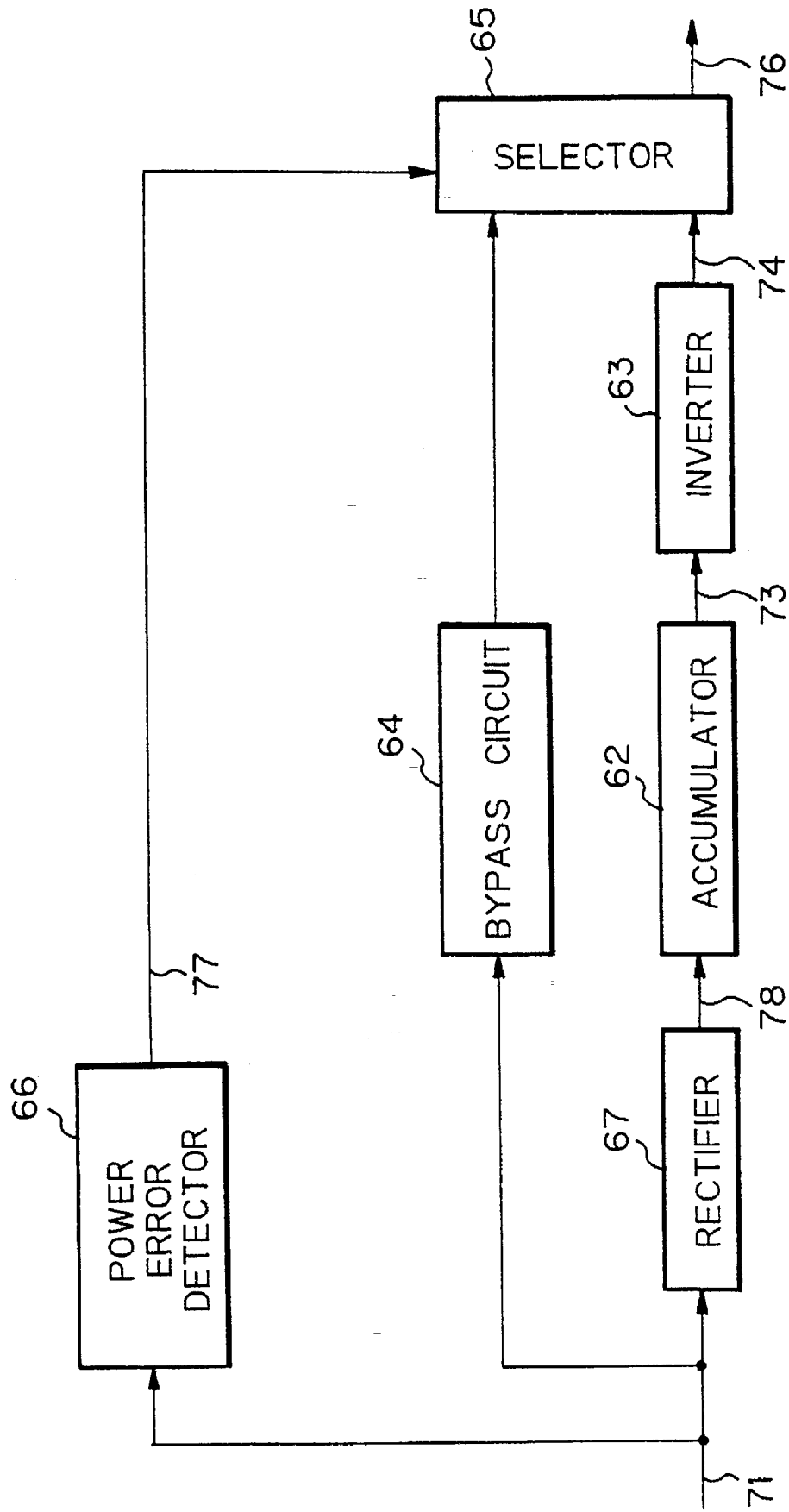
FIG. 2 is a schematic block diagram of a conventional constant commercial source type failure-free power source device.

FIG. 2 shows a conventional constant commercial source type failure-free power source device. As shown, the power source device has a rectifier 67 for transforming an AC input 71 from a commercially available power source or similar AC power source to a DC current 78. An accumulator 62 accumulates the DC current 78 and remains in a stand-by state, preparing for a discharge at the time of a power failure. An inverter 63 converts a DC current 73 output from the accumulator 62 to a stable AC inverter output 74 only when the AC input 71 is interrupted. A bypass circuit 64 produces, when the AC input 71 is normal, a bypass output 75 by delivering the AC input 71 therethrough. A power error detector 66 receives the AC input 71 and outputs a power error signal 77 on detecting an error in the input 71. A selector, or switching circuit, 65 selects the bypass output 75 when the AC input 71 is normal. On receiving the power error signal 77 from the power error detector 77, the selector 65 selects the inverter output 74 so as to output an AC output 76.

Figure 4:
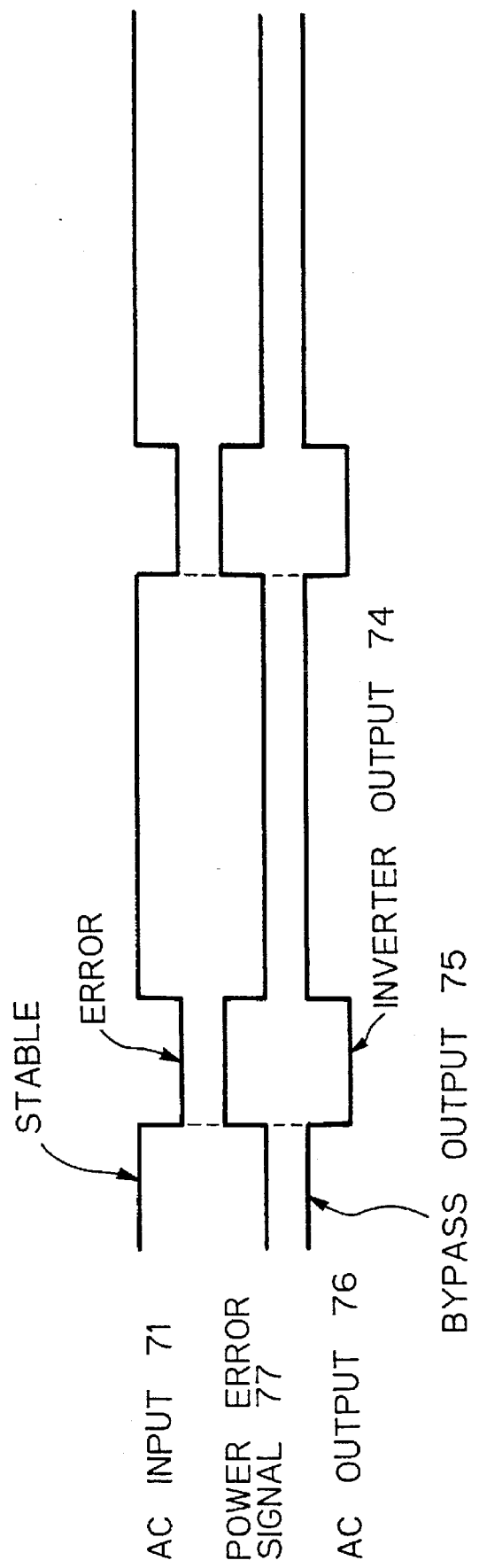
FIG. 4 is a timing chart demonstrating the operation of the conventional constant commercial source type device.

The operation of the device shown in FIG. 2 will be described with reference also made to FIG. 4. As long as the AC input 71 is fed to the rectifier 76, it delivers the DC current 78 to the accumulator 62. In this condition, the inverter 63 remains in a stand-by state without any load acting thereon. The selector, or switching circuit, 65 constantly selects the bypass output 75 and delivers it as the AC output 76. When an error occurs in the AC input 71, the power error detector 66 detects it and sends a power error signal 77 to the selector 65. In response, the selector 65 selects the inverter output 74 in place of the bypass output 75 and delivers it as the AC output 76. As soon as the AC output 71 recovers, the power error detector 66 stops sending the signal 77. As a result, the selector 65 again selects the bypass output 75.

As stated above, the constant commercial source type device directly outputs an AC input from a commercially available power source when it is normal, while routing it through an inverter only when an error occurs in the AC input. This type of device is desirable when the commercial power source is stable and for loads of the kind not needing stable AC power.

However, the conventional power source devices shown in FIGS. 1 and 2 have some problems yet to be solved, as stated earlier. Specifically, when the constant commercial source type device is introduced in a power supply system wherein a commercial power supply is unstable, the AC output of the device itself becomes unstable. This renders a load faulty, reduces the life of an accumulator due to the frequent discharge of the accumulator, and interrupts the AC output in the event of a power failure due to the short charging of the accumulator. On the other hand, when the constant inverter type device is applied to a power source system wherein a commercial power source is stable, it brings about wasteful power consumption due to conversion losses within the device and generation of heat and noise.

Figure 3:
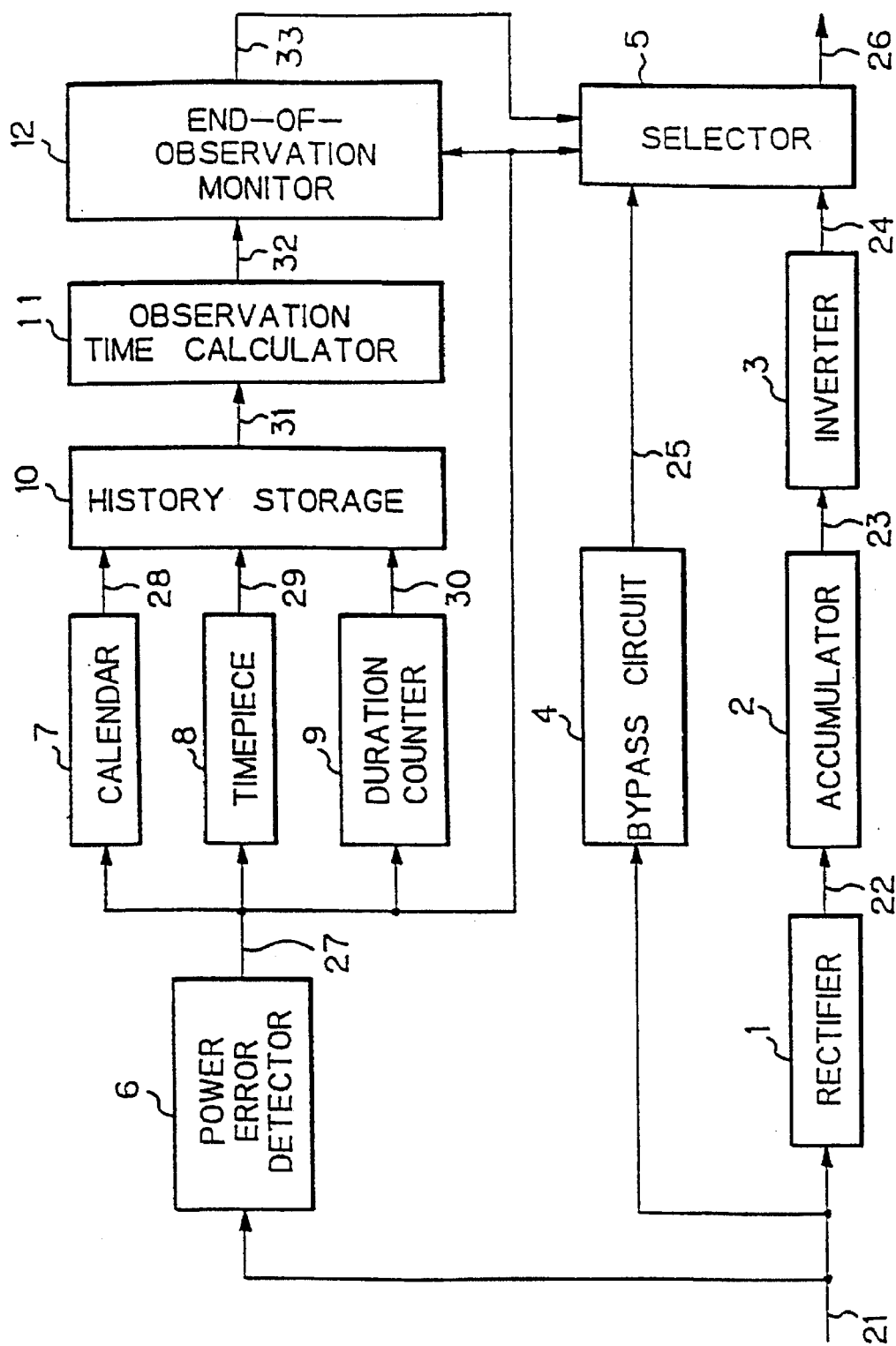
FIG. 3 is a block diagram schematically showing a failure-free power source device embodying the present invention.

Referring to FIG. 3, a failure-free power source device embodying the present invention will be described. As shown, a rectifier 1 converts an AC input 21 from a commercially available power source or similar AC power source to DC power 22. An accumulator 2 accumulates the DC power 22 while producing DC power 23 and remains in a stand-by state, preparing for a discharge at the time of a power failure. An inverter 3 transforms the DC power 23 from the accumulator 2 to a stable AC inverter output 24. A bypass circuit 4 produces a bypass output 25 by routing the AC input 21 therethrough. A power error detector 6 receives the AC input 21 and outputs a power error signal 27 on detecting an error in the input 21. A calendar 7 outputs, on receiving the power error signal 27 from the power error detector 6, a date signal 28 representing the date on which the error occurred. A timepiece 8 outputs, on receiving the power error signal 27, a time signal 29 representing the time when the error occurred. A time counter 9 counts, on receiving the power error signal 27, the duration of the signal 27, i.e., the duration of an error and outputs a duration signal 30 representing it. A history storage 10 stores such date signals 28, time signals 29 and duration signals 30 and outputs a history signal 31 representing the past power error data. An observation time calculator 11 calculates, based on the history signal 31, a period of time over which the progress has been observed, while outputting the period of time as an observation time signal 32. An end-of-observation monitor 12 monitors the power error signal 27 while receiving the observation time signal 31 and outputs a switching signal 33. A selector, or switching circuit, 5 selects either the inverter output 24 or the bypass output 25 in response to the power error signal 27 or the switching signal 33, thereby producing an AC output 26.

Figure 5B:
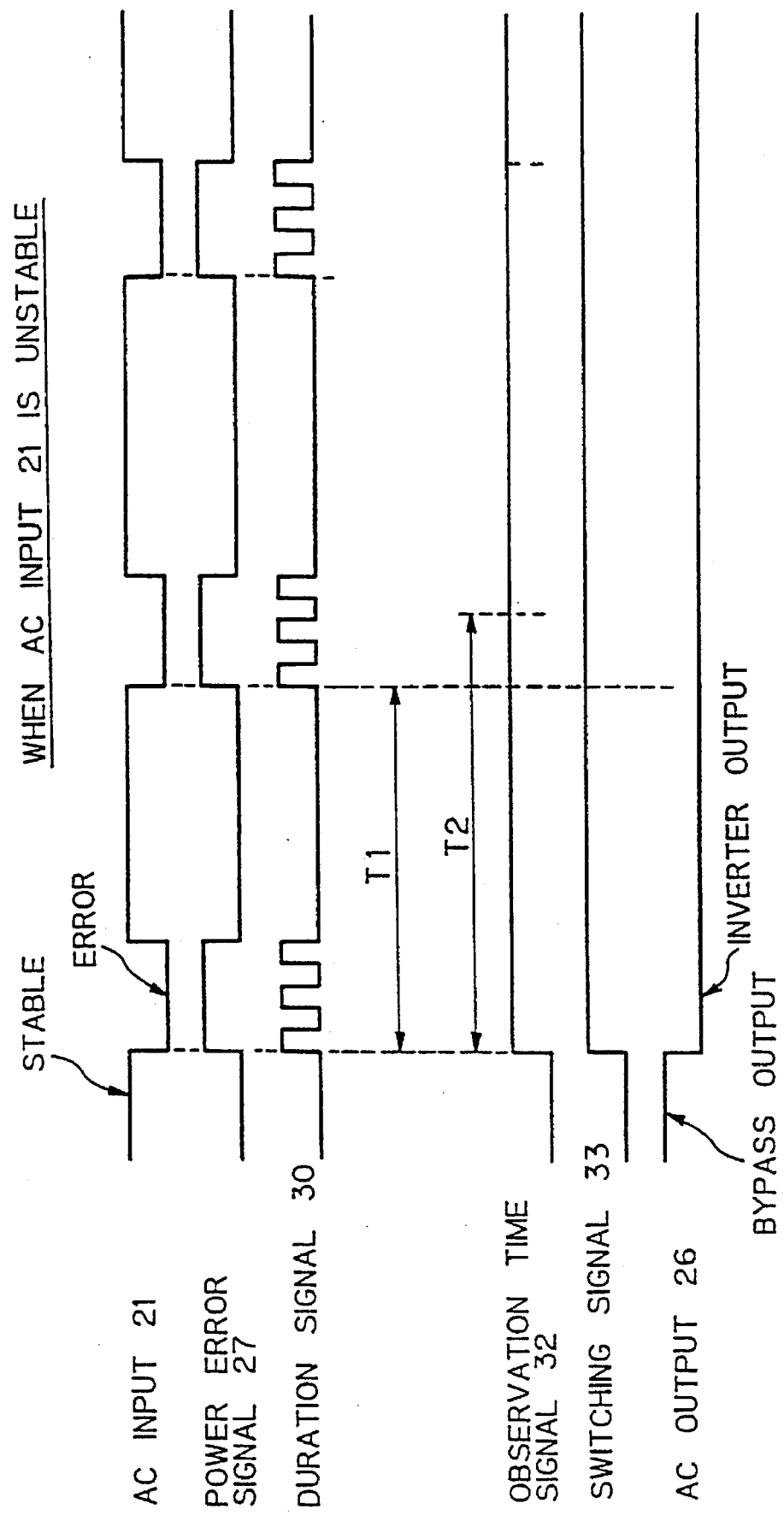

A reference will also be made to FIGS. 5A and 5B for describing a specific operation of the illustrative embodiment. As shown in FIGS. 5A and 5B, as long as the AC input 21 is stable, the power error detector 6 does not output the power error signal 27. In the initial state, the observation time calculator 11 does not output the switching signal 33. When the selector 5 receives neither the power error signal 27 nor the switching signal 33, it selects the bypass output 25.

When the AC input 21 is interrupted due to a power failure or similar cause, the rectifier 1 stops feeding the DC power 22 to the accumulator 2. As a result, the accumulator 2 releases energy accumulated therein so as to continuously feed the DC power 23. Also, the inverter 3 continuously delivers the inverter output 24. On the other hand, the bypass circuit 4 stops producing the bypass output 25 due to the interruption of the AC input 21. The power error detector 6 outputs a power error signal 27, causing the selector 5 to select the inverter output 24.

On receiving the power error signal 27, the calendar 7 outputs the date as a date signal 28. Also, in response to the power error signal 27, the timepiece 8 outputs the time as a time signal 29. Further, the duration counter 9 counts the duration of the power error signal 27 and outputs a duration signal 30 representing it. Every time the history storage 10 receives the date signal 28, time signal 29 and duration signal 30, it stores them and outputs a history signal, or history data, 31 representing the history of power errors. The observation time calculator 11 calculates a period of time over which the progress has been observed in response to the history signal 31, thereby producing an observation time signal 32. The end-of-observation monitor 12 outputs a switching signal 33 in response to the signal 32, monitors the period of time up to the input of the next power error signal 27, and then stops outputting the switching signal 33 when a predetermined period of time expires.

As soon as the AC input 21 recovers, the rectifier 1 again starts feeding the DC power 22 to the accumulator 2. Consequently, the accumulator 2 starts accumulating the DC power 22 while continuously feeding the DC power 23.

In FIGS. 5A and 5B, labels T1 and T2 respectively represent the interval between consecutive power errors and the period of time over which the progress has been observed. Specifically, in FIG. 5A indicating a case wherein the AC input 21 is stable, the end-of-observation monitor 12 determines that the AC input 21 has become stable since the interval T2 is longer than the period of time T1, thereby causing the selector 5 to select the bypass output 25. In FIG. 5B indicating a case wherein the AC input 21 is unstable, the monitor 12 determines that the AC input 21 is unstable since the interval T1 is shorter than the period of time T2, i.e., the observation time signal 32 is not reset. As a result, the selector 5 selects the inverter output 24. In this way, the inverter output 24 is continuously output via the selector 5 when the AC input 21 fails often.

In summary, in accordance with the present invention, a failure-tree power source device memorizes the history of errors of a commercial power source, monitors the stability or the power source on the basis of the history, directly outputs, when the power source remains stable for more than a predetermined period of time, an AC input as an AC output, and releases, when an error occurs in the power source, energy stored in an accumulator until a predetermined period of time expires to thereby output it as an AC output via an inverter. Hence, the power source device can be installed at any desired location without resorting to the advance examination of a commercial power source as to the degree of stability. Moreover, even when installed in a power source system wherein the commercial power source is unstable, the device obviates the faults of a load, the decrease in the life of an the accumulator due to the frequent discharge thereof, interruption of an AC output at the time of a power failure due to the short charging of the accumulator, and so forth. In addition, the device eliminates wasteful power consumption due to conversion losses within the device and the generation of heat and noise.

Various modifications will become possible for those skilled in the art after receiving the teachings of the present disclosure without departing from the scope thereof.

What is claimed is:

1. A failure-free power source device comprising:

a rectifier for converting input AC power to first DC power;

an accumulator for accumulating said first DC power to prepare for a discharge at the time of a power failure, while outputting second DC power;

an inverter for converting said second DC power to AC power to thereby output an inverter signal;

power error detecting means for receiving said input AC power and for detecting an error in said input AC power and outputting a power error signal in response to said detection;

end-of-observation monitoring means, having means for receiving a sequential plurality of said power error signals, for outputting a switching signal in response to a power error signal received subsequent to said sequential plurality, and for terminating said switching signal in response to not receiving a further subsequent power error signal for an observation time duration, said observation time duration based on said received sequential plurality of said power error signals; and selecting means for outputting, on receiving at least one of said power error signal and said switching signal, said inverter output as an AC output and for outputting, when neither said power error signal nor said switching signal appears, said input AC power as said AC output.

2. A device according to claim 1, wherein said end-of-observation monitoring means comprises:

a calendar for outputting, in response to said power error signal, a date signal representing a date at which said power error signal appears;

a timepiece for outputting, in response to said power error signal, a time signal representing a time at which said power error signal appears;

a duration counter for counting, in response to said power error signal, a duration over which said power error continues, and outputting a duration count signal representing said duration;

a history storage for retrievably storing, said observation time duration, said observation time duration corresponding to a period of time over which said input AC power has been observed as to stability; and an end-of-observation monitor for determining, in response to said data representing said observation time duration and said power error signal, whether said input AC power has remained stable for said observation time duration and outputting said switching signal representing a result of said determining.

3. A device according to claim 1, wherein said end-of-observation monitoring means comprises:

a calendar for outputting, in response to said power error signal, a date signal representing a date at which said power error signal appears.

4. A device according to claim 3, wherein said end-of-observation monitoring means further comprises a history storage for retrievably storing date signal.

5. A device according to claim 4, wherein said end-of-observation monitoring means further comprises:

an observation time calculator for receiving from said history storage said stored date signal and calculating, in response thereto, said observation time duration, said observation time duration corresponding to a period of time over which said input AC power has been observed as to stability.

6. A device according to claim 5, wherein said end-of-observation monitoring means further comprises:

an end-of-observation monitor for determining, in response to said data representing said observation time duration and to said power error signal, whether said input AC power has remained stable for said observation time duration and outputting said switching signal representing a result of said determining.

7. A device according to claim 3, wherein said end-of-observation monitoring means further comprises a history storage for retrievably storing said time signal.

8. A device according to claim 7, wherein said end-of-observation monitoring means further comprises:

an observation time calculator for receiving from said history storage said stored time signal and calculating, in response thereto, said observation time duration, said observation time duration corresponding to a period of time over which said input AC power has been observed as to stability.

9. A device according to claim 8, wherein said end-of-observation monitoring means further comprises:

an end-of-observation monitor for determining, in response to said data representing said observation time duration and to said power error signal, whether said input AC power has remained stable for said observation time duration and outputting said switching signal representing a result of said determining.

10. A device according to claim 3, wherein said end-of-observation monitoring means further comprises a history storage for retrievably storing said duration count signal.

11. A device according to claim 10, wherein said end-of-observation monitoring means further comprises:

an observation time calculator for receiving from said history storage said duration count signal and calculating, in response thereto, said observation time duration, said observation time duration corresponding to a period of time over which said input AC power has been observed as to stability.

12. A device according to claim 11, wherein said end-of-observation monitoring means further comprises:

an end-of-observation monitor for determining, in response to said data representing said observation time duration and to said power error signal, whether said input AC power has remained stable for said observation time duration and outputting said switching signal representing a result of said determining.

13. A device according to claim 1, wherein said end-of-observation monitoring means comprises:

a timepiece for outputting, in response to said power error signal, a time signal representing a time at which said power error signal appears.

14. A device according to claim 1, wherein said end-of-observation monitoring means comprises:

a duration counter for counting, in response to said power error signal, a duration over which said power error continues, and outputting a duration count signal representing said duration.

15. A device according to claim 1, wherein said end-of-observation monitoring means further comprises:

a calendar for outputting, in response to said power error signal, a date signal representing a date at which said power error signal appears;

a timepiece for outputting, in response to said power error signal, a time signal representing a time at which said power error signal appears;

a duration counter for counting, in response to said power error signal, a duration over which said power error continues, and outputting a duration count signal representing said duration; and history storage means for retrievably storing date signal, said time signal, and said duration count signal.

16. A device according to claim 15, wherein said end-of-observation monitoring means further comprises an observation time calculator for receiving from said history storage said stored date signal, time signal and duration count signal and calculating, in response thereto said observation time duration, said observation time duration corresponding to a period of time over which said input AC power has been observed as to stability.

17. A device according to claim 16, wherein said end-of-observation monitoring means further comprises an end-of-observation monitor for determining, in response to said data representing said observation time duration and said power error signal, whether said input AC power has remained stable for said observation time duration and outputting said switching signal representing a result of said determining.

18. A device according to claim 1, wherein said end-of-observation monitoring means comprises:

means for calculating and storing a data representing said observation time duration, said calculation based on said sequential plurality of said received power error signals.

19. A device according to claim 18, wherein said end-of-observation monitoring means further comprises:

means for outputting said switching signal in response to said subsequent power error signal;

means for starting a running timer in response to said subsequent power error signal and generating a running output T1 signal;

means for comparing said data representing said observation time duration and said T1 signal and for outputting said switching signal on the concurrent condition of not receiving said further subsequent power error signal and said T1 being greater than said data representing said observation time duration.

* * * * *